United States Patent [19]

Anthony

[11] 4,064,275

[45] Dec. 20, 1977

[54] PROCESS TO HYDRATE AND ENRICH WHOLE GRAINS FOR LIVESTOCK

[75] Inventor: Wilson Brady Anthony, Auburn, Ala.

[73] Assignee: Feeds and Feeding Research, Inc., Auburn, Ala.

[21] Appl. No.: 603,969

[22] Filed: Aug. 12, 1975

Related U.S. Application Data

[63] Continuation of Ser. No. 356,475, May 2, 1973, abandoned.

[51] Int. Cl.² .............................................. A23B 7/10
[52] U.S. Cl. ..................................... 426/53; 426/507; 426/623; 426/418
[58] Field of Search .................. 426/18, 44, 52–54, 426/506, 507, 521, 418, 419, 623

[56] References Cited

U.S. PATENT DOCUMENTS

| | | | |
|---|---|---|---|
| 1,188,623 | 6/1916 | Cheney | 426/54 |
| 1,615,024 | 1/1927 | Mabee | 426/53 |
| 1,693,611 | 12/1928 | Mabee | 426/53 |
| 3,459,554 | 8/1969 | Hashimoto | 426/53 |
| 3,637,399 | 1/1972 | Neel | 426/507 |

*Primary Examiner*—Norman Yudkoff
*Assistant Examiner*—Martin G. Mullen
*Attorney, Agent, or Firm*—Cushman, Darby & Cushman

[57] ABSTRACT

An improved process to hydrate and enrich dry whole grains for enhanced nutritional value for livestock by placing the dry grains in an enclosed storage facility and continuously recirculating water to hydrate the dry grains to the desired amount. The recirculating water may contain feedstuff additives such as vitamins, nutrients and minerals and the recirculating water may further be passed through a pasteurizing unit in order to inhibit the growth of undesirable microorganisms. The recirculating water is fed through a nozzle at the top of a storage facility and allowed to flow rapidly to the bottom of the storage facility and into a sump storage tank. In addition, the process provides for fermenting the nutrient solution prior to or during the time of its recirculation through the column of grain.

7 Claims, 1 Drawing Figure

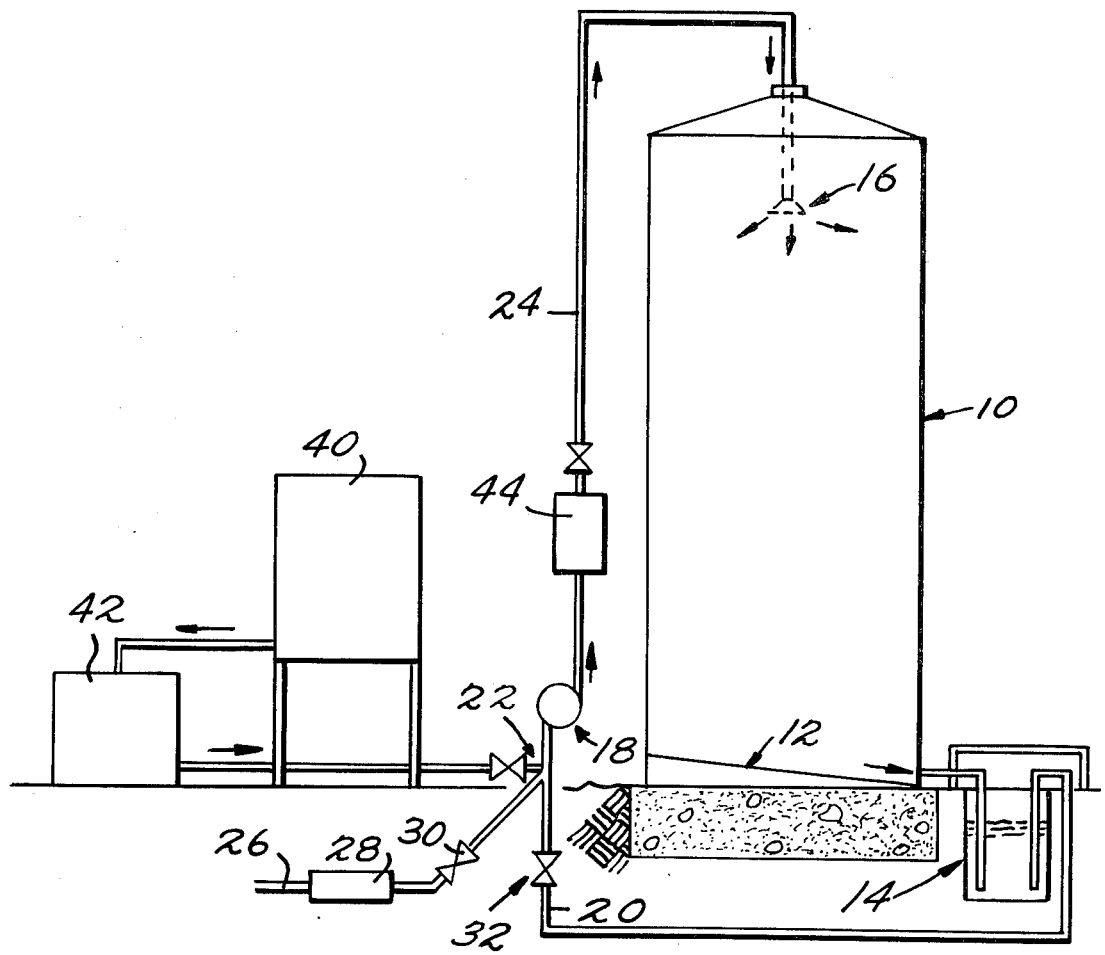

PROCESS TO HYDRATE AND ENRICH WHOLE GRAINS FOR LIVESTOCK

This is a continuation of application Ser. No. 356,475 filed May 2, 1973 now abandoned.

BACKGROUND OF THE INVENTION

The present invention deals with a process of hydrating whole dry grains and other feedstuffs in order to enhance nutritional value of the feedstuffs and grain for livestocks.

Recent publications have described a process by which a higher feeding value of livestock feedstuffs may be accomplished by hydrating whole dry grain. In these processes, the grain is sprayed with water in order to reconstitute the dry grains to a moisture level of 20–28% based on the weight of the reconstituted grain. A moisture content of up to 30–35% is desirable but cannot be achieved by these prior art processes because the amount of water added to the grain is limited to the water adhering to the outer surface of the dry grain. If the water is added to the dry grain stored in a silo, excess water percolates or flows immediately to the bottom of the storage tank and usually emits as a runoff from the structure. This condition makes it practically impossible to add enough water to dry grain to hydrate it to the preferred moisture content. Also because the added water drains to the bottom of the structure, grain in the lower part of the storage tank will be much wetter than grain in the upper portion of the silo. Frequently, the grain near the top of the storage will present a favorable environment for the growth of fungi. These fungi may cause loss of nutritional value and may actually add toxic substances to the grain. Thus, current processes for reconstituting (hydrating) dry grain used for animal feed are not adequate. Because of the failure of current processes to permit addition of exact amounts of liquid to the stored grain and in addition the failure of current processes to maintain even distribution of liquid throughout the column of stored grain, it is essentially impossible to use other than water as the hydrating medium. This is a serious deficiency since most grains can benefit from the addition of certain nutrient enrichment when fed to livestock. The preferred point of adding these nutrients would be when the grain was mixed with water and stored in a silo.

SUMMARY OF THE INVENTION

These deficiencies noted in the prior art are overcome by the present invention which provides a continuous recirculation system for the water, optionally containing the nutrients, used to hydrate the dry whole grain. After the dry grain or feedstuffs are stored in a conventional silo or storage tank, the recirculating water is sprayed through a nozzle from the top of the silo, the spray nozzle being designed in order to assure that the water is uniformly sprayed throughout the cross-sectional area of the silo or storage tank. The water is then allowed to percolate or rapidly flow through the silo down to the bottom of the structure where it is collected and recirculated to the top of the structure. If desired, the recirculating system may be adapted to incorporate a nutrient holding tank to feed in various vitamins, nutrients, or minerals. If it is desired to control the growth of undesirable microorganisms, it is also possible to add a pasteurizing unit through which the recirculating water, optionally containing the nutrients, vitamins and minerals, passes before being sprayed through the nozzle head at the top of the storage structure.

The storage facility employed in the present invention may take the form of a generally vertical tower silo which is generally constructed of conventional materials such as concrete staves or metal plate. These structures are generally coated on the interior to prevent deterioration by the silage acids.

Any dry whole grain for which it is desired to hydrate or reconstitute the grain back to its normal moisture content may be employed in the present process. Additionally, it is also possible to hydrate any inert feedstuffs which are a porous and bulky material having a sufficient number of air pockets in order to allow rapid percolation or flow of a liquid through a column of the material. Obviously a mixture of these inert feedstuffs and dry grains may be hydrated as a mixture in the present invention. Examples of suitable dry whole grains which exhibit increased nutritional value when hydrated are corn, sorghum, barley, wheat and rice. In order to achieve the higher nutritional value of the grains, it is desired to hydrate the dry grains up to the normal moisture content of the natural grain. Various types of grains produced under various conditions exhibit a different natural moisture content. The optimum nutritional value of feeds is generally achieved when the grains are hydrated to a moisture content of 25% up to the maximum moisture absorption percent based on the weight of the hydrated grain. Generally this range is 25–40% by weight for dry grains in general and 30–35% by weight for corn, sorghum, barley and wheat. Examples of inert feedstuffs which may be added to the feedstuffs, are woodshavings, corn husks, and peanut hulls. These inert materials may be hydrated by the present process in order to add nutritional value to them. The only requirement for the present process is that these inert roughage materials be sufficiently porous or bulky to provide air pockets allowing rapid percolation or flow of the hydrating liquid through the column of material.

During the continuous recirculation of the hydrating liquid, the material in the tower silo will be hydrated during the first 2 to 4 days during which time the pump will be operating continuously. After about 7 days, the pump will operate only at intermittent periods. The whole dry grain having been hydrated after about 7 days could be ground and fed to animals, however, recent research results indicate that an ensilage period long enough to initiate the fermentation process which is preferably about 21 days maximizes the improved nutritional value of the grain. This increase in nutritional value results from fermentation which is the process by which microorganisms change or transform NPN (non-protein nitrogen) to microbial protein. Fermentation also results in some physical breakdown of the stored material which aids the adsorption of water. These microorganisms occur naturally on the grain or may be supplied in the optional nutrient solution which also contains NPN, minerals and vitamins. The minimum temperature needed for fermentation is generally around 50° F, while 75°–100° F is the preferred temperature range. Therefore, in cold climates it is necessary to insulate the tower silo and to heat the recirculating hydrating liquid if it is intended that fermentation take place. Thus, due to the presence of these microorganisms the process of fermentation can take place during the continuous pumping or recirculation of the hydrating liquid. However, it is preferred to allow the nutrient solution to ferment prior to the addition of the nutrient solution into the circulating hydrating liquid system. During the process of hydrating the dry whole grains, the recirculating water will penetrate the outer skin of the grain while the nutrients and microbial proteins will only slightly penetrate the skin surface of the grain and will generally be held on the surface of the grain.

The optional nutrient solution may contain various vitamins, minerals and nutrients which are suitable for animal feedstuffs. These various additives are based on the published data of the National Research Council concerning the nutient requirements of the animals to be fed. For example, cattle generally require the addition of vitamins A, D and E whereas swine require these vitamins in addition to water soluble B vitamins. Various NPN sources such as urea, biuret, and ammonia salts may also be added to the nutrient solution. Various mineral sources may also be added to the nutrient solution such as a calcium source, such as $CaCo_3$, $Ca(OH)_2$, $CaSO_4$, etc.; a phosphorus source, such as dicalcium phosphate, monocalcium phosphate, ammonium phosphate, sodium polyphosphate, defluoronated phosphate rock, etc.; and trace minerals such as zinc sulphate, manganese sulphate, copper sulphate, etc. Thus, it is apparent to one skilled in the art that various well known nutrients, vitamins, and minerals may be added to the recirculating hydrating liquid of the present invention and no detailed discussion of the types or quantities is necessary.

If it is undesirable to have the products of fermentation in the reconstituted or hydrated grain, the recirculating fluid is pasteurized before it is sprayed onto these stored materials in the tower silo. The pasteurizer generally heats the recirculating fluid to a temperature of at least 180° F for a time sufficient to kill the microorganisms, generally in the range of 15 to 90 seconds.

After the stored material has been hydrated and fermented to the desired amount, the material may be held indefinitely within the tower silo, fed to the animals or put in bags.

This continuous recirculating system for hydrating stored materials results in uniform hydration throughout the column of the material while still achieving full hydration of the material. Production of organic acids from fermentation and even distribution of these products throughout the column of storage material help to inhibit growth of undesirable microorganisms. Additionally, the recirculating system allows full retention within and on the surface of the stored material of all the added liquid and nutrients, thus, avoiding any run-off.

PREFERRED EMBODIMENT

An illustration of one arrangement of equipment to recycle fluid from the bottom of the silo back to the top is presented in the FIGURE. A tower silo 10 is provided in which the material to be stored such as dry whole grain is placed in the silo in a conventional fashion. Silo 10 may be constructed of concrete or metal and coated on the inside to retard deterioration by the silage acids. A slight modification of the floor 12 is made to provide a drain into sump 14 for collection of the recirculating fluid. Also, in the top of the silo, brackets are installed in order to position a spray nozzle 16. The size of the spray nozzle 16 will be determined by the capacity of the silo. Generally, the recirculating rate is in the range of 50–150 gallons per minute, however, smaller or larger flow rates can be used depending on the size of the storage facility. The spray nozzle will be constructed in order to diffuse the liquid over the entire cross-sectional area of the silo. A pump 18 and a power source (not shown) are installed in order to connect the sump 14 through tee 22 on the inlet side of the pump to the outlet side 24 of the pump back to the spray nozzle 16.

A source of fresh water 26 is connected to the tee on the inlet side of the pump. Various flow meters such as flow meter 28 may be employed to measure the recirculating rates of the fluids in the present invention. Valves 30 and 32 are placed in the system so that the pump is fed either from fresh water line 26 or the silo sump 14.

After the silo is filled with a known amount of material to be hydrated, water inlet valve 30 is opened and pump 18 is turned on it order to feed in the desired amount of water to hydrate the material. When the desired amount of water has been added to the system the inlet water valve 30 is turned off and the valve 32 is opened to feed the pump from the silo sump. Various limit switches (not shown) are placed in the sump so that the pump will not operate unless there is a desired amount of fluid in the sump. Usually the pump will operate continuously for the first 2 to 4 days; however, after about 7 days the pump will operate only intermittently for very short periods.

If it is desired to add the nutrient solution to the recirculating water, a nutrient solution holding tank 40 and a mixing tank 42 are also provided. In this arrangement, the water will be fed into the mixing tank followed by the nutrient solution. Next, the recirculating pump 18 will be operated and the water and the nutrients will be pumped into the spray nozzle 16. The pump will continue to recirculate the fluid until all of it is held by the product in the storage silo 10.

If it is desirable to control the products of fermentation, a pasteurizing unit 44 is added to the system in order to kill the undesirable organisms. The recirculating fluid is passed through the pasteurizing unit 44 before it is sprayed through the nozzle 16 onto the stored material.

The following examples will serve to further illustrate the invention, bearing in mind that the invention is not limited thereto. Unless otherwise expressed, all percentages by weight are based on the weight of the hydrated material.

EXAMPLE I

The arrangement shown in the Figure was employed for the storage of corn except for the pasteurizer 44 and the nutrient solution holding and mixing tanks 40 and 42. The silo was filled to about two-thirds capacity with dry corn. Into the recirculating system, 860 lbs. of water were added per ton of stored dry corn. This water was continuously circulated until all of it was absorbed by the grain. After seven days the pump was operating only for very short periods of time and the grain was fully hydrated to a level of 30%. The grain at this time was suitable for animal feedstuffs but it was further held for a total ensilaging period of 21 days for maximum improvement of nutritional value.

EXAMPLE II

The arrangement of Example I was employed with the further addition of nutrient solution holding tank 40 and mixing tank 42. The tower silo was again filled to two-thirds capacity of dry whole corn. The nutrient solution contained vitamins A, D and E, and NPN. This nutrient solution was recirculated with water at an amount sufficient to hydrate the corn to 30 to 35%. Again, the pump continued to recirculate the fluid until all of it was held by the product in storage.

EXAMPLE III

The arrangement employed in Example I and Example II each were used with the addition of pasteurizing unit 44 which was connected to the outlet side of the pump. In this manner, fluid recirculated to the top of the silo was pasteurized before it was sprayed onto the grain in order to prevent the products of fermentation from existing in the hydrated grain with and without the added nutrient solution.

EXAMPLE IV

Each of the arrangements of Examples I-III were employed in this example. The stored corn was removed for feeding beginning at about 15 days after the initial filling of the silo. Once or twice weekly as required, new product and the proper amount of recirculating fluid could be added to the silo. The recirculating pump continued to keep the fluid recirculating as feed from the lower part of the silo was removed. This advantage of the invention is not the same advantage as that assigned to conventional top filling and bottom unloading silos. In prior art systems, water added to the top of the silo along with the grain percolated rapidly to the bottom where it accumulates and adds to the excess moisture already there. Recirculation of the free fluid back to the top of the silo in the present invention, however, uniformly hydrates the new product added to the top while still receiving all the other benefits of the ensilaging process.

EXAMPLE V

The arrangement and conditions for Example II were employed for this example with the exception that the water/nutrient solution was fermented by *Lactobacillus* sp. before it was pumped into the silo. Generally, the fermentation takes place in about 48 hours which occurs during the recirculation of the water/nutrient solution or may be carried out previously by fermenting the nutrient solution alone.

Various modifications of the above process and apparatus will be apparent; it being noted that the apparatus described in the FIGURE is only representative and that various other arrangements of equipment may be employed to accomplish the purposes of the present invention. For example, high moisture storage tanks can be modified to include the teachings of the present invention.

I claim:

1. A process for hydrating material comprising:
   placing a material consisting of dry whole grain, in a generally vertical storage facility;
   feeding a liquid comprising water to the top of the storage facility and onto the storage material;
   allowing the liquid to flow through the material to the bottom of the storage facility; and
   recirculating the liquid from the bottom of the storage facility to the top of the storage facility until the stored material is uniformly hydrated to a desired amount.

2. A process according to claim 1 wherein the desired amount is from about 25% to the maximum absorption percent by weight of the hydrated material.

3. A process according to claim 2 wherein said grain material consists of corn, barley, wheat or sorghum and the desired amount of hydration is about 30-35% by weight without loss of liquid through runoff.

4. A process according to claim 1 wherein fermentation is allowed to occur during the recirculation of the liquid.

5. A process according the claim 4 wherein additional microorganisms are added to the recirculating liquid in order to cause fermentation.

6. A process according to claim 1 wherein the recirculating liquid is pasteurized before feeding the liquid to the top of the storage facility, said pasteurizing preventing the growth of undesirable organisms.

7. A process according to claim 1 wherein the material is periodically removed and additional material is added to the vertical storage facility, the removed material being re-hydrated and enriched to the desired amount.

* * * * *